April 25, 1944.  W. R. FREEMAN  2,347,186

SLACK ADJUSTER

Filed Dec. 14, 1942

INVENTOR
W. R. FREEMAN

BY

ATTORNEY

Patented Apr. 25, 1944

2,347,186

UNITED STATES PATENT OFFICE 2,347,186

SLACK ADJUSTER

Walter R. Freeman, Clayton, Mo., assignor to Wagner Electric Corporation, St. Louis, Mo., a corporation of Delaware Application December 14, 1942, Serial No. 468,889

8 Claims. (Cl. 74—522)

My invention relates to slack adjusters and more particularly to one for brake actuating mechanism whereby the slack in said actuating mechanism resulting from brake shoe wear may be taken up.

One of the objects of my invention is to produce an improved slack adjuster of the worm and worm wheel type which will be economical to manufacture, easy to adjust and so designed that the moving parts can be properly lubricated and so maintained.

Another object of my invention is to so construct a slack adjuster of the type referred to that both the worm and worm wheel can be journaled directly on the ends of their teeth and adjusted by an independent unit not forming any part of the mounting for the worm.

Figure 1:
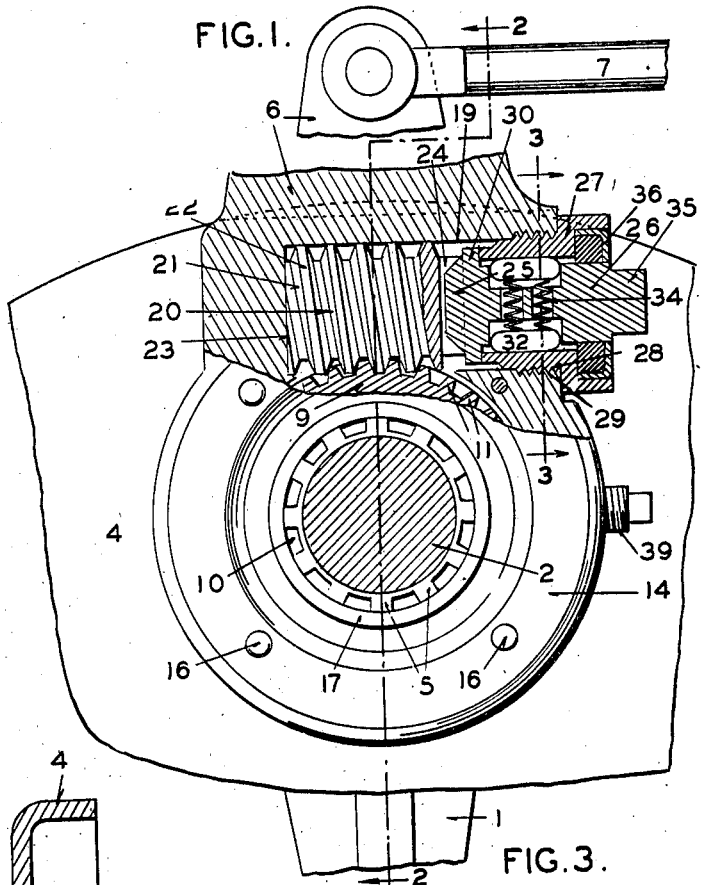
Figure 2:
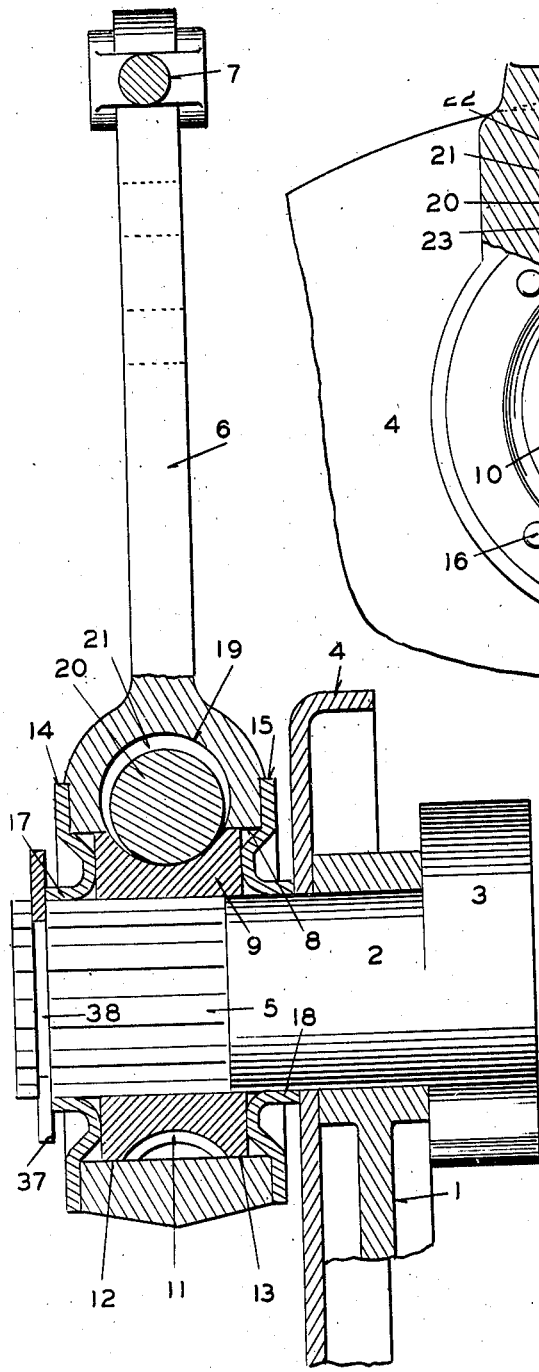
Figure 3:
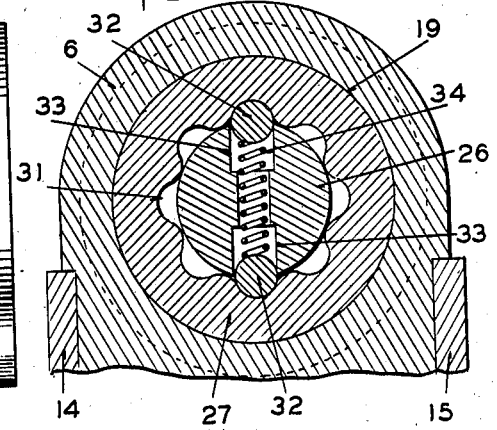

Other objects of my invention will become apparent from the following description taken in connection with the accompanying drawing in which Figure 1 is a view, partly in section, of a slack adjuster embodying my invention; and Figures 2 and 3 are sectional views taken on the lines 2—2 and 3—3, respectively, of Figure 1.

Referring to the drawing in detail, numeral 1 indicates a portion of the supporting spider for a brake in which is journaled a cam shaft 2 provided with an S-type cam 3 on its inner end for actuating the ends of the brake friction device (shoes) in a well-known manner. The outer end of the cam shaft projects beyond the closure or dust plate 4 of the brake which encloses the usual drum and said outer end is provided with splines 5. This cam shaft is adapted to be actuated by a lever or arm 6 mounted on the splined end of the cam shaft. A rod 7 is connected to the arm to actuate the brake from a remote point.

As the brake friction device wears it will be necessary to move the arm a greater distance to take up slack and apply the brakes. In order to eliminate this slack it is desirable that a slack take-up means be provided which can be adjusted as wear takes place. This is conveniently embodied between the end of the splined shaft and the arm.

In accordance with my invention the hub portion of the arm 6 is provided with a cylindrical opening 8 which supports a worm wheel 9 provided with internal splines 10 for cooperation with the splines on the cam shaft. The teeth 11 of the worm wheel are cut from the central circumferential surface of the blank in order to leave cylindrical surfaces 12 and 13 on opposite sides for engagement with the internal surface of the cylindrical opening 8. These engaging surfaces provide a bearing for the arm whereby said arm will be rotatably supported by means of the worm wheel on the shaft. The worm wheel is held in position in the opening in the arm by means of plates 14 and 15 secured to the opposite sides of the arm by pins 16 passing through the arm. Plate 14 is provided with an outwardly extending flange 17 and a like outwardly extending flange 18 is provided on plate 15. These flanges cooperate with the cam shaft to provide additional support for the arm.

The hub portion of the arm is also provided with a bore 19 closed at one end and having its axis positioned at right angles to the axis of the cylindrical opening 8. The two axes are so related that the bore intersects the cylindrical opening at one side. The bore has a worm 20 mounted therein, thread 21 of which is cut so that it has an outer peripheral bearing surface 22 of such diameter as to have a close fit within the bore. This provides a mounting for the worm without the necessity of shaft projections on the worm.

When in position the worm has one end abutting the inner end 23 of the bore. The other end of the worm is provided with a slot 24 in which is received a transverse projection 25 integral with the inner end of an adjusting shaft 26. The fit between the slot and projection is "sloppy" in order that no binding will be present in the event of slight mis-alignment of the axes of the shaft and worm. This adjusting shaft is journaled in an annular nut 27 which is provided with external threads 28 for cooperation with threads 29 at the outer end of the bore. The shaft 26 also has a flange 30 on its inner end for cooperation with the inner end of the plug, thus holding the shaft in position so that projection 25 thereon will be held in slot 24.

The inner surface of the nut is formed with circumferentially spaced longitudinally extending recesses 31 for cooperation with two detents 32 carried by the adjusting shaft. These detents are cylindrical in shape with semi-spherical ends and are positioned within diametrical recesses 33 in the shaft. The shaft carries springs 34 which press outwardly on the detents to thus yieldably hold them in recesses 31 of the plug. It is thus seen that these detents hold the shaft and the worm in any adjusted position desired yet they will permit turning of the shaft and worm when desired by the use of a wrench cooperating with a wrench receiving portion 35 on the outer end of the shaft. A suitable seal 36 is carried by the plug to retain lubricant in the bore and also to prevent any foreign matter from entering the bore.

The arm and slack adjusting assembly are held on the cam shaft by a suitable washer 37 received in a groove 38 of the shaft. The hub of the arm is also provided with an opening provided with a closure plug 39 which permits lubricant to be inserted in the worm wheel.

When it is desired to take up any slack between the arm and the cam shaft, such may be done by merely turning the adjusting shaft 35 with a wrench. This will rotate the worm and through it the worm wheel, thus changing the relationship between the cam shaft 2 and the arm. The adjusted position will be maintained by the detents 32.

It is to be noted that the construction just described is well sealed against the entry of any foreign matter to the moving parts of the take-up mechanism. Also, lubricant in the take-up mechanism will be retained therein. The construction eliminates any special mounting shaft for the worm as it is journaled in the bore on its own thread. Since no mounting shaft is employed, the worm may be cut from a long piece of worm stock, thus decreasing the cost of manufacture. The construction is also such that the adjusting means for the worm and the detent for holding said adjusting means is independent of the worm and has only a connection therewith by means of a projection fitting into a slot. Because this projection and slot have a loose fit, any mis-alignment in the mounting of the worm and actuating shaft will have no binding effect. The arrangement does not require close dimensioning in the manufacture of the nut and adjusting shaft.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a slack adjusting mechanism for association with an actuating shaft and comprising an actuating arm, a worm wheel rotatably supported in the arm and adapted to be secured to the actuating shaft, a worm mounted in the arm and cooperating with the worm wheel, an adjusting shaft for turning the worm, said shaft being separate from the worm and rotatably mounted in the arm independent of the worm and adjacent one end thereof, interengaging means between the worm and the adjusting shaft, and means for yieldably holding the shaft in different positions to which it may be rotated.

2. In a slack adjusting mechanism for association with an actuating shaft and comprising an actuating arm, a worm wheel rotatably supported in the arm and adapted to be secured to the actuating shaft, a worm mounted in the arm and cooperating with the worm wheel, an adjusting shaft for turning the worm, said shaft being separate from the worm and rotatably mounted in the arm independent of the worm and adjacent one end thereof, interengaging means between the worm and the adjusting shaft, and means for yieldably holding the shaft in different positions to which it may be rotated, said last named means comprising diametrically positioned cylindrical members carried by the adjusting shaft, means carried by the arm providing circumferentially spaced recesses for receiving the cylindrical members and a spring for biasing the cylindrical members radially outwardly to engage the recesses.

3. In a slack adjusting mechanism for association with an actuating shaft and comprising an actuating arm, a worm wheel rotatably supported in the arm and adapted to be secured to the actuating shaft, a bore in the arm, a worm mounted in the bore and cooperating with the worm wheel, an annular bearing member mounted in the bore, an adjusting shaft separate from the worm journaled in the bearing member, inter-engaging means on adjacent ends of the worm and shaft for turning the worm by the shaft, and means comprising yieldable detent means associated with the shaft and bearing member for holding the shaft in different positions to which it may be rotated.

4. In a slack adjusting mechanism for association with an actuating shaft and comprising an actuating arm, a worm wheel rotatably supported in the arm and adapted to be secured to the actuating shaft, a bore in the arm closed at one end, a worm mounted in the bore and cooperating with the worm wheel, an annular bearing nut threaded in the open end of the bore, an adjusting shaft journaled in the nut and being provided with a shoulder for cooperation with the inner end of the nut for maintaining the shaft in position, inter-engaging means on adjacent ends of the worm and shaft for turning the worm by the shaft, and means comprising yieldable detent means associated with the shaft and nut for holding the shaft in different positions to which it may be rotated.

5. In a slack adjusting mechanism for association with an actuating shaft and comprising an actuating arm, a worm wheel rotatably supported in the arm and adapted to be secured to the actuating shaft, a bore in the arm, a worm mounted in the bore and cooperating with the worm wheel, an annular bearing member mounted in the bore, an adjusting shaft separate from the worm journaled in the bearing member, inter-engaging means on adjacent ends of the worm and shaft for turning the worm by the shaft, and means for yieldably holding the shaft and worm in adjusted positions, said means comprising circumferentially spaced recesses in the inner surface of the bearing member, diametrically positioned cylindrical members carried by the adjusting shaft, and a spring interposed between the cylindrical members for forcing them radially outwardly into the recesses.

6. In a slack adjusting mechanism for association with an actuating shaft and comprising an actuating arm having a hub portion provided with a cylindrical opening and an intersecting bore at right angles thereto and closed at one end, a worm wheel supported in the cylindrical opening and adapted to be secured to the shaft, a worm positioned in the bore and engaging the worm wheel, said worm having one end abutting the end of the bore and being journaled by its threads on the surface of the bore, an adjusting shaft, means for journaling the shaft in the open end of the bore, separable cooperating means on the adjacent ends of the shaft and worm for turning the worm and worm wheel by rotation of the shaft, and detent means for holding the shaft in a plurality of different rotative positions.

7. In a slack adjusting mechanism for association with an actuating shaft and comprising an actuating arm having a hub portion provided with a cylindrical opening and an intersecting bore at right angles thereto, a worm wheel supported in the cylindrical opening and adapted to be secured to the shaft, a worm positioned in the bore and engaging the worm wheel, said worm being journaled by its threads on the surface of the bore, a separate adjusting shaft journaled in the arm longitudinally of one end of the worm, separable cooperating means on the adjacent ends of the shaft and worm for turning the worm and worm wheel by rotation of the shaft, and detent means comprising means carried by the adjusting shaft and arm for holding the shaft in a plurality of different rotative positions.

8. In a slack adjusting mechanism for association with an actuating shaft and comprising an actuating arm having a hub portion provided with a uniform cylindrical opening therethrough, a worm wheel adapted to be secured to the shaft, said wheel being mounted in the opening and having cylindrical portions on each side of its teeth for bearing engagement with the cylindrical surface of said opening, annular retaining plates secured to opposite sides of the arm, a bore extending partially into the arm at right angles to the axis of the cylindrical opening and intersecting the opening, a worm mounted in the bore and having its inner end abutting the wall formed by the arm at the inner end of the bore, a shaft connected to the worm at its outer end and extending to the exterior of the bore, and detent means for yieldably holding the worm in adjusted position comprising diametrically-positioned members carried by the shaft and a spring positioned in the shaft and biasing the members outwardly.

WALTER R. FREEMAN.